United States Patent [19]

Inui et al.

[11] Patent Number: 4,875,566
[45] Date of Patent: Oct. 24, 1989

[54] GEAR SYNCHRONIZER MECHANISM

[75] Inventors: Masaki Inui; Shozo Okuda; Masaki Hosono, all of Toyota, Japan

[73] Assignee: Toyota Jidosha Kabushiki Kaisha, Aichi, Japan

[21] Appl. No.: 134,069

[22] Filed: Dec. 16, 1987

[30] Foreign Application Priority Data

| Dec. 16, 1986 | [JP] | Japan | 61-299710 |
| Dec. 17, 1986 | [JP] | Japan | 61-300718 |
| Dec. 19, 1986 | [JP] | Japan | 61-196632 |
| Dec. 19, 1986 | [JP] | Japan | 61-196633 |

[51] Int. Cl.⁴ ............................................. F16D 23/06
[52] U.S. Cl. .................. 192/53 F; 192/53 A; 192/53 G
[58] Field of Search ............ 192/53 A, 53 E, 53 F, 192/53 G, 53 R; 74/339

[56] References Cited

U.S. PATENT DOCUMENTS

| 1,828,508 | 10/1931 | Murray | 192/53 A |
| 2,470,208 | 5/1949 | Avila | 192/53 F |
| 2,992,714 | 7/1961 | Peras | 192/53 F |
| 3,737,016 | 6/1973 | Worner | 192/53 F |
| 3,749,215 | 7/1973 | Rommelshausen | 192/53 F |
| 4,782,929 | 11/1988 | Müller | 192/53 F |

FOREIGN PATENT DOCUMENTS

| 0100025 | 2/1984 | European Pat. Off. | |
| 241640 | 10/1987 | European Pat. Off. | 192/53 F |
| 1244493 | 7/1967 | Fed. Rep. of Germany | 192/53 G |
| 1475333 | 11/1969 | Fed. Rep. of Germany | |
| 1815372 | 7/1970 | Fed. Rep. of Germany | |
| 2117557 | 10/1972 | Fed. Rep. of Germany | |
| 3217950 | 11/1983 | Fed. Rep. of Germany | |
| 1184390 | 7/1959 | France | |
| 1250284 | 11/1960 | France | |
| 1285331 | 1/1962 | France | |
| 2118537 | 7/1972 | France | |
| 51-48540 | 12/1976 | Japan | |
| 576487 | 4/1946 | United Kingdom | |
| 596950 | 1/1948 | United Kingdom | 192/53 R |
| 938282 | 10/1963 | United Kingdom | |

Primary Examiner—Rodney H. Bonck
Assistant Examiner—David A. Testardi
Attorney, Agent, or Firm—Oliff & Berridge

[57] ABSTRACT

In a gear synchronizer mechanism including a gear member rotatable on a shaft and having a cylindrical hub portion, a hub member mounted on the shaft for rotation therewith, a clutch sleeve formed at its one side with an internal conical surface and at its inner periphery with internal spline teeth in continual engagement with external spline teeth of the hub member and being axially shiftable on the hub member to be engaged at its internal spline teeth with external spline teeth of the hub portion, and a synchronizer ring formed with an external conical surface for frictional engagement with the internal conical surface of the sleeve and being axially movable on the hub portion to establish synchronization between the shaft and the gear when engaged with the sleeve, the hub portion of the gear is formed at its inner periphery with an annular groove and has a plurality of circumferentially spaced radial grooves defined therein, each of which receives therein a corresponding radially movable key element, and the key elements are supported by a radially contractible annular spring disposed within the annular groove of the hub portion and are resiliently engaged with the ring under the biasing force of the spring in such a manner as to restrict axial movement of the ring in shifting operation of the clutch sleeve.

6 Claims, 17 Drawing Sheets

Fig. 5(a)  Fig. 5(b)
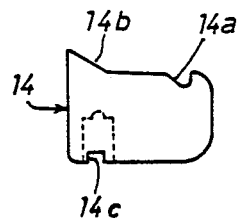
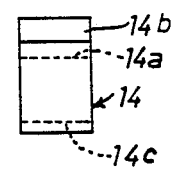
Fig. 6
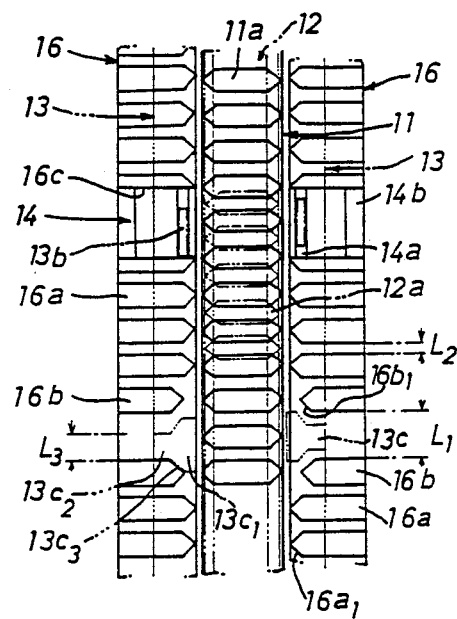

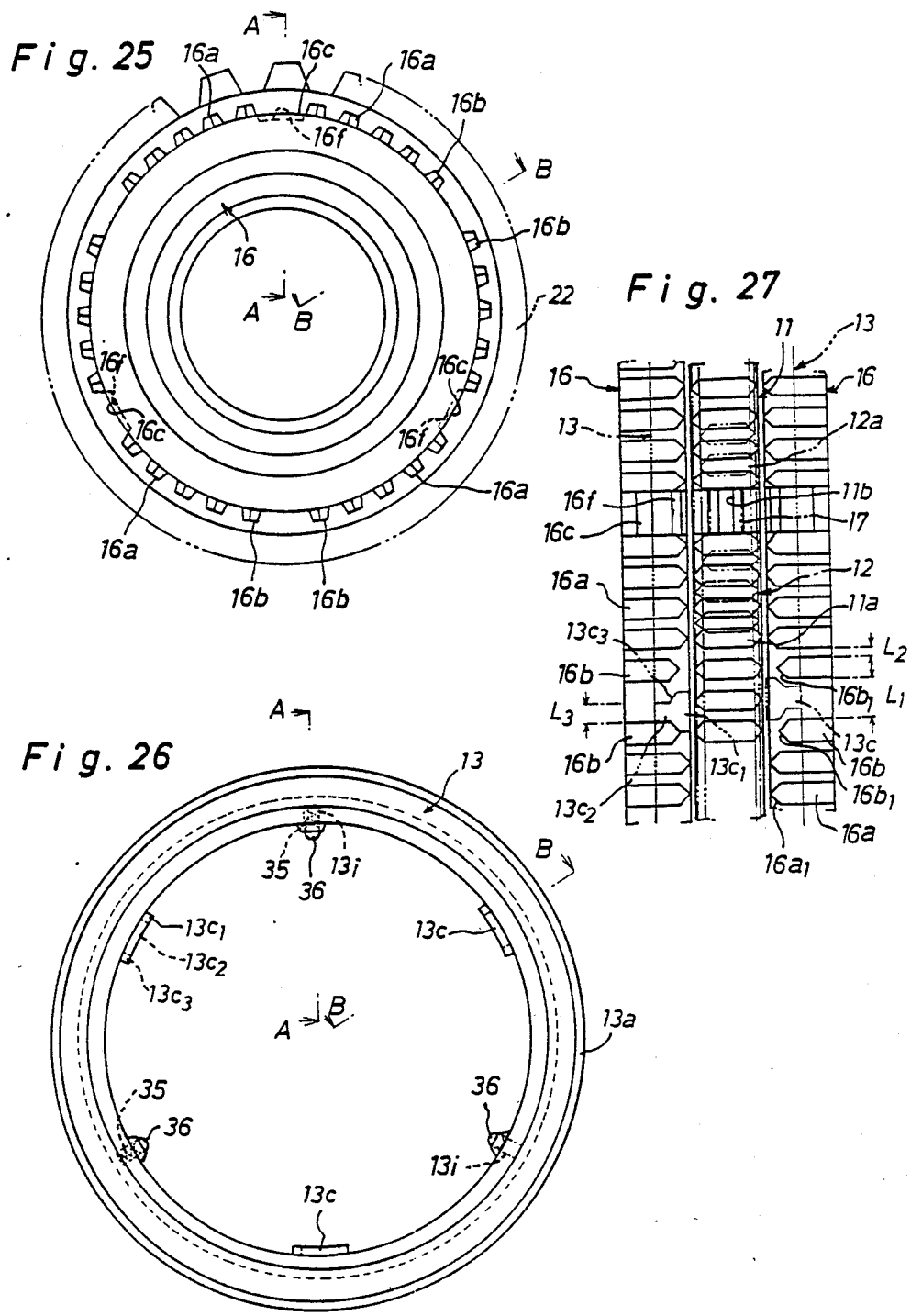

GEAR SYNCHRONIZER MECHANISM

BACKGROUND OF THE INVENTION

1. Field of the Invention

The present invention relates to a gear synchronizer mechanism adapted for use in manually shifted power transmissions, and more particularly, but not exclusively, to a gear synchronizer mechanism of the type which comprises a gear member provided at its one side with a cylindrical hub portion and rotatable on a transmission shaft, a hub member mounted on the shaft for rotation therewith, a clutch sleeve formed at its one side with an internal conical surface and at its inner periphery with internal spline teeth in continual engagement with external spline teeth of the hub member and being axially shiftable to be engaged at its internal spline teeth with external spline teeth of the cylindrical hub portion, a synchronizer ring formed at its outer periphery with an external conical surface for frictional engagement with the internal conical surface of the clutch sleeve and being axially movable on the cylindrical hub portion to effect synchronization between the shaft and the gear member when engaged at its external conical surface with the internal conical surface of the clutch sleeve in shifting operation, and resilient means for biasing the synchronizer ring toward clutch sleeve and for restricting axial movement of the synchronizer ring by engagement therewith in shifting operation.

2. Description of the Prior Art

In Japanese Patent Publication No. 51-48540, there has been proposed such a synchronizer mechanism as described above, wherein the synchronizer ring is formed at its inner periphery with a plurality of circumferentially equally spaced radial projections which are axially slidably disposed within corresponding radial grooves in the cylindrical hub portion of the gear member, and wherein a radially contractible annular spring is engaged with each recessed inner end of the radial projections to bias the synchronizer ring toward the clutch sleeve and engaged with an annular groove in the inner periphery of the cylindrical hub portion to restrict axial movement of the synchronizer ring. In shifting operation of the clutch sleeve, the synchronizer ring is engaged at its external conical surface with the internal conical surface of the clutch sleeve and urged toward the gear member under the thrust pressure applied thereto from the clutch sleeve. When the thrust pressure acting on the synchronizer ring exceeds a predetermined value, synchronization between the relative rotating parts is established, and the annular spring is disengaged from the annular groove of the cylindrical hub portion. Subsequently, the annular spring is radially inwardly compressed by engagement with an internal conical surface of the cylindrical hub portion.

In such arrangement of the annular spring as described above, reliable synchronization between the relative rotating parts may not be effected if the restriction force acting on the synchronizer ring is unstable due to an error in assembly of the components or differences in tolerances of the assembled components. In the case that an annular spring of large diameter cross-section is assembled as the annular spring to stabilize the restriction force acting on the synchronizer ring, it will cause an increase of frictional resistance when compressed by engagement with the internal conical surface of the hub portion and will cause an increase of the biasing force acting on the synchronizer ring in its shifted position. As a result, the biasing force of the spring will act to cause unexpected disengagement of the synchronizer ring from the clutch sleeve, and the internal conical surface of the hub portion will be defaced by frictional engagement with the spring in a short period of time.

SUMMARY OF THE INVENTION

It is, therefore, a primary object of the present invention is to provide an improved gear synchronizer mechanism capable of effecting reliable synchronization between the relative rotating parts regardless of any error in assembly of the components or any differences in tolerances of the assembled components.

A secondary object of the present invention is to provide an improved gear synchronizer mechanism, having the above-described characteristics, wherein the synchronizer ring is more reliably retained in its shifted position to avoid unexpected disengagment from the clutch sleeve.

Another object of the present invention is to provide an improved gear synchronizer mechanism, having the above-described characteristics, wherein the restriction force acting on the synchronizer ring is maintained in a predetermined value for a long period of time to ensure shifting operation of the clutch sleeve under a stable load.

According to the present invention, the objects are attained by providing a gear synchronizer mechanism which comprises a gear member rotatable on a transmission shaft and having a cylindrical hub portion formed with external spline teeth, a hub member formed with external spline teeth and being mounted on the shaft for rotation therewith, a clutch sleeve formed at one side thereof with an internal conical surface and at an inner periphery thereof with internal spline teeth in continual engagement with the external spline teeth of the hub member and being axially shiftable on the hub member to be engaged at the internal spline teeth thereof with the external spline teeth of the cylindrical hub portion, and a synchronizer ring formed with an external conical surface for frictional engagement with the internal conical surface of the clutch sleeve and being axially movable on the cylindrical hub portion to establish synchronization between the shaft and the gear member when engaged with the clutch sleeve. In the gear synchronizer mechanism, the cylindrical hub portion of the gear member is formed at an inner periphery thereof with an annular groove and has a plurality of circumferentially equally spaced radial grooves defined therein, each of which receives therein a corresponding radially movable key element. The key elements are supported by a radially contractible annular spring disposed within the annular groove of the cylindrical hub portion and are resiliently engaged with the synchronizer ring in such a manner as to restrict axial movement of the synchronizer ring in shifting operation of the clutch sleeve.

Alternatively, the cylindrical hub portion of the gear member is formed at an outer periphery thereof with an annular groove which is arranged across the external spline teeth of the hub portion to receive therein a radially contractible annular spring, while the synchronizer ring is formed at an inner periphery thereof with an annular groove which corresponds with the annular groove of the cylindrical hub portion, the annular spring being engaged at a portion thereof with the annular groove of the synchronizer ring to restrict axial movement of the synchronizer ring in shifting operation of the clutch sleeve. In this case, the clutch sleeve is arranged to be connected with the synchronizer ring in shifting operation.

BRIEF DESCRIPTION OF THE DRAWINGS

Additional objects, features and advantages of the present invention will become more readily apparent from the following detailed description of certain preferred embodiments thereof when considered with reference to the accompanying drawings, in which:

FIG. 5(a) is a side view of a key element shown in FIG. 1;

FIG. 5(b) is a front view of the key element;

FIG. 6 illustrates the relative positions of the component parts shown in FIGS. 1 and 2;

FIGS. 23 and 2 illustrate a further modification of the synchronizer mechanism shown in FIGS. 11 to 14, the illustration of FIG. 23 being taken along line A—A in FIGS. 25 and 26, respectively, and the illustration of FIG. 24 being taken along line B—B in FIGS. 25 and 26, respectively.

FIG. 25 is a front view of a cylindrical hub portion of the change-speed gear shown in FIGS. 23 and 24;

FIG. 26 is a front view of a synchronizer ring shown in FIGS. 23 and 24;

FIG. 27 illustrates the relative positions of the components shown in FIGS. 23 and 24;

DESCRIPTION OF THE PREFERRED EMBODIMENTS

Figure 1:
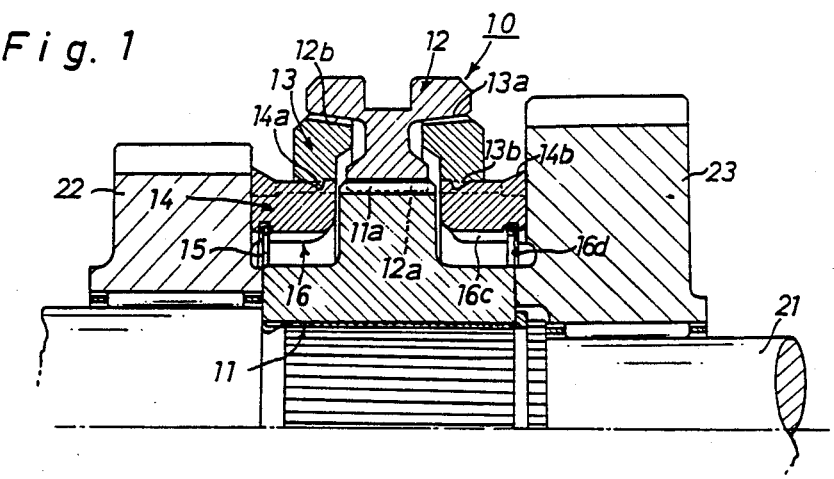
FIG. 1 illustrates in cross-sectional form one of circumferentially equi-spaced parts of a gear synchronizer mechanism in accordance with the present invention, the cross-section being taken along line I—I in FIGS. 3 and 4, respectively.
Figure 2:
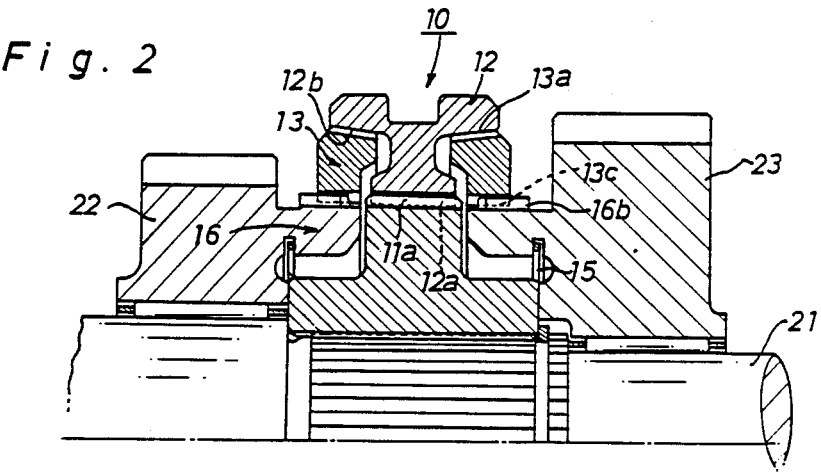
FIG. 2 illustrates in cross-sectional form one of the other circumferentially equi-spaced parts of the gear synchronizer mechanism, the cross-section being taken along line II—II in FIGS. 3 and 4, respectively.

Referring now to the drawings, where like reference numerals represent the same or corresponding parts throughout the figures, there is illustrated in FIG. 1 a transmission shaft 21, on which are rotatably supported a pair of change-speed gears 22 and 23. The change-speed gears 22 and 23 are arranged to be in mesh with driven gears mounted on an output shaft (not shown) in a transmission housing. Disposed between the change-speed gears 22 and 23 is a pair of synchronizer mechanisms 10 which are operable to cause selective speed synchronization between the shaft 21 and the gears 22 and 23, respectively. As is illustrated in FIGS. 1 and 2, the synchronizer mechanisms have a common hub member 11 which is formed thereon with external spline teeth 11a and fixed to the transmission shaft 21 by means of a spline connection for rotation therewith. The synchronizer mechanisms are arranged to be operated through a clutch sleeve 12 which is connected by a yoke groove to a conventional manually operated shift mechanism (not shown). The clutch sleeve 12 is arranged in surrounding relationship with the hub member 11 and has internal spline teeth 12a in continual engagement with the external spline teeth 11a of hub member 11. The clutch sleeve 12 has a sleeve portion formed at its opposite sides with a pair of internal conical surfaces 12b.

Figure 4:
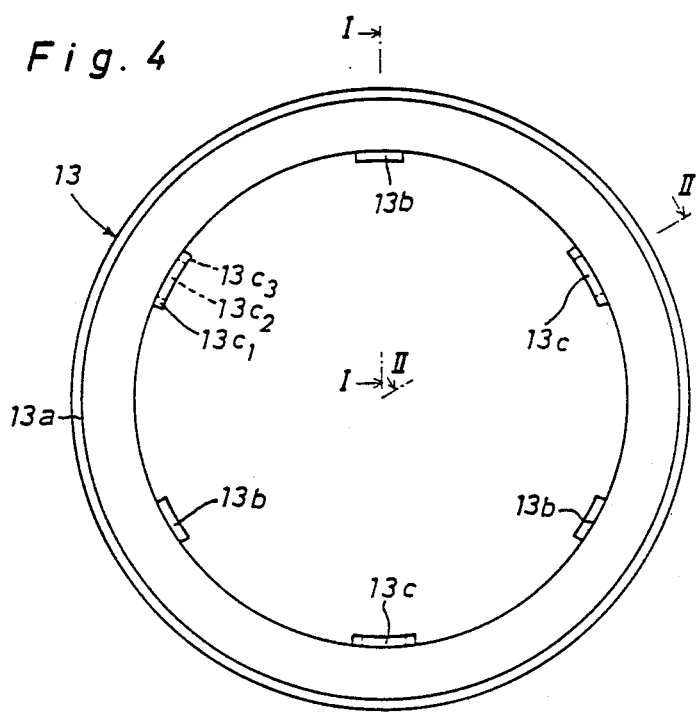
FIG. 4 is a front view of a synchronizer ring shown in FIGS. 1 and 2.

The right-hand synchronizer mechanism is substantially the same as he left-hand synchronizer mechanism such that a detailed description of the left-hand synchronizer mechanism only is believed necessary. The left-hand synchronizer mechanism includes a synchronizer ring 13 which is axially slidably mounted on a cylindrical hub portion 16 of change-speed gear 22 through three circumferentially equally spaced key elements 14. The synchronizer ring 13 is formed at its outer periphery with an external conical surface 13a for frictional engagement with the internal conical surface 12b of clutch sleeve 12. As shown in FIG. 4, the synchronizer ring 13 is formed at its inner periphery with three circumferentially equally spaced first internal radial projections 13b and with three circumferentially equally spaced second internal radial projections 13c. The first radial projections 13b of synchronizer ring 13 each are engaged with a corresponding recess 14a in one of the key elements 14. As shown in FIG. 6, the second radial projections 13c of synchronizer ring 13 each are formed with large and small width portions $13c_1$ and $13c_2$ and chamfered at $13c_3$ between the large and small width portions $13c_1$ and $13c_2$.

Figure 3:
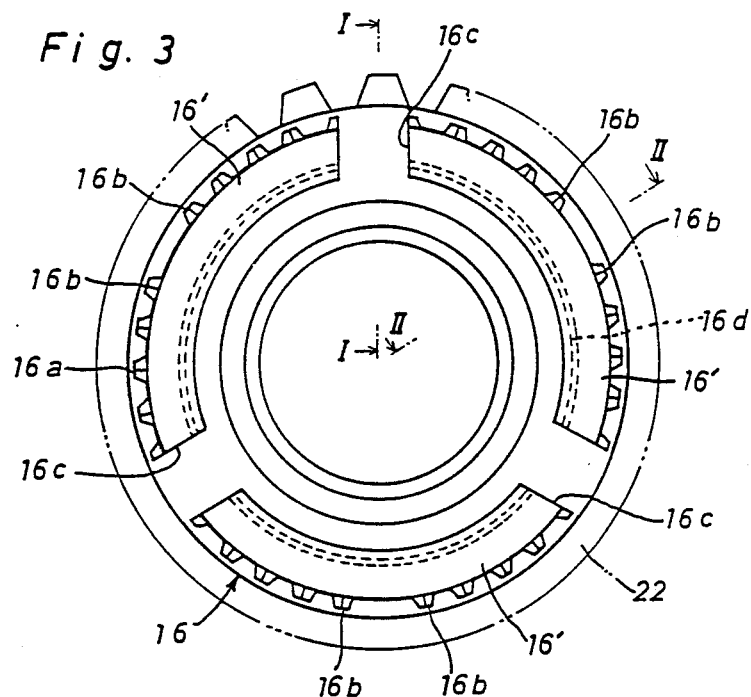
FIG. 3 is a front view of a cylindrical hub portion of a change-speed gear shown in FIGS. 1 and 2.

As shown in FIGS. 3 and 6, the cylindrical hub portion 16 of gear 22 is formed thereon with first and second external spline teeth 16a and 16b. As shown in FIG. 6, the second external spline teeth 16b are shorter than the first external spline teeth 16a to define a space within which is disposed the large width portion $13c_1$ of radial projection 13c. The hub portion 16 has three circumferentially equally spaced radial grooves 16c defined therein, each of which receives therein a corresponding key element 14, which divide into three hub sections 16'. The external spline teeth 16a and 16b are arranged on the respective hub sections 16' to be engaged with the internal spline teeth 12a of clutch sleeve 12. The shorter external spline teeth 16b are arranged in a pair between two sets of the first longer external spline teeth 16a and spaced circumferentially in a distance $L_1$ which is larger than a distance $L_2$ between the respective first longer external spline teeth 16a. The distance $L_1$ between spline teeth 16b is also larger than the width $L_3$ of portion $13c_2$ of second radial projection 13c. The external spline teeth 16a, 16b each are chamfered at their inner ends $16a_1$ and $16b_1$. The chamfers $16b_1$ of shorter external spline teeth 16b are arranged to be engaged with the chamfers $13c_3$ of second internal radial projection 13c. As shown in FIGS. 1 and 3, the cylindrical hub portion 16 of gear 22 is further formed at its inner periphery with an annular groove 16d which receives therein a radially contractible annular spring 15.

As shown in FIGS. 1 and 6, the key elements 14 are radially movably disposed within the respective radial grooves 16c of cylindrical hub portion 16 and supported by the annular springs 15 for resilient engagement with the synchronizer ring 13. As shown in FIG. 5, the key elements 14 each are formed at an upper portion with a transverse recess 14a for engagement with the first internal radial projections 13b of synchronizer ring 13 and a radially outwardly flared end 14b for engaging an outer edge of synchronizer ring 13 when shifted leftwards in the figure. The key elements 14 each are formed at a bottom portion with a transverse groove 14c for engagement with the annular spring 15.

In such arrangement as described above, the key elements 14 are engaged at their transverse recesses 14a with the respective internal radial projections 13b of synchronizer ring 13 to restrict axial movement of the synchronizer ring 13 under the biasing force of C-letter spring 15. As shown in FIG. 6, the second internal radial projections 13c of synchronizer ring 13 each are positioned between each pair of shorter external spline teeth 16b in such a manner as to permit relative rotation between the synchronizer ring 13 and the cylindrical hub portion 16 of gear 22. When relative rotation of the synchronizer ring 13 and hub portion 16 is caused in shifting operation of the clutch sleeve 12 in a leftward direction, the second internal radial projections 13c of ring 13 are engaged at their chamfers $13c_3$ with the chamfers $16b_1$ of shorter external spline teeth 16b, as shown by imaginary lines in FIG. 6.

Figure 7:
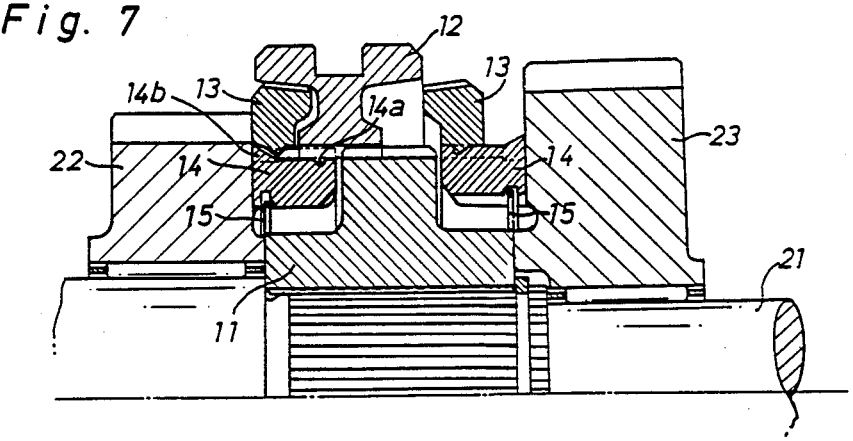
FIGS. 7 and 8 each illustrate a shifted condition of the clutch sleeve shown in FIGS. 1 and 2, respectively.
Figure 8:
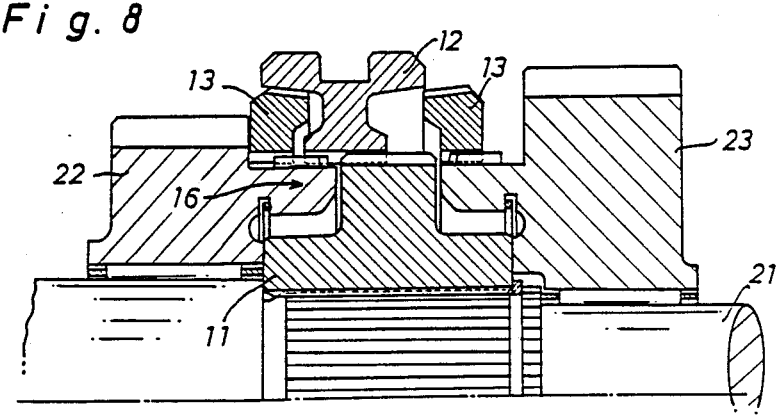

When the clutch sleeve 12 is retained in a neutral position as shown in FIGS. 1 and 2, it freely rotates with the hub member 11 on transmission shaft. When the clutch sleeve 12 is shifted leftwards from the neutral position, the synchronizer ring 13 is frictionally engaged at its external conical surface 13a with the left-hand internal conical surface 12b of clutch sleeve 12 to rotate with the clutch sleeve 12 and is urged toward the change-speed gear 22 against a restriction force caused by engagement with the key elements 14 under the biasing force of spring 15. This causes relative rotation between the synchronizer ring 13 and the cylindrical hub portion 16 of gear 22 and causes the second internal radial projections 13c of ring 13 to engage the shorter external spline teeth 16b of hub portion 16. As a result, the axial movement of clutch sleeve 12 is resisted by the balk action or engagement between the chamfers $13c_3$ of internal radial projections 13c and the chamfers $16b_1$ of shorter external spline teeth 16b to establish synchronization between the clutch sleeve 12 and the gear 22. Subsequently, the first internal radial projections 13b of ring 13 ride over the key elements 14 against the biasing force of spring 15 thereby compressing them radially inwardly. This permits the second internal radial projections 13c of ring 13 to pass through axial grooves respectively formed between the shorter external spline teeth 16b of hub portion 16. Thus, as shown in FIGS. 7 and 8, the internal spline teeth 12a of clutch sleeve 12 are smoothly brought into engagement with the first external spline teeth 16a of hub portion 16 to accomplish drive connection between the transmission shaft 21 and the change-speed gear 22. After engagement of the clutch sleeve 12 with the hub portion 16 of gear 22, the outer edge of synchronizer ring 13 is engaged with the respective flared portions 14b of key elements 14 under the biasing force of spring 15.

When the clutch sleeve 12 is shifted from the left-hand position toward the neutral position to disconnect the change-speed gear 22 from the transmission shaft 21, the internal spline teeth 12a of clutch sleeve 12 are disengaged from the first external spline teeth 16a of hub portion 16 to release the compression of key elements 14. As a result, the key elements 14 are radially outwardly moved and axially inwardly tilted by the biasing force of spring 15. This causes the synchronizer ring 13 to slide axially inwardly and engage the respective transverse recesses 14a of key elements 14 at their first internal radial projections 13b. Thus, the synchronizer ring 13 is returned to the neutral position and retained in place as shown in FIGS. 1 and 2.

As will be understood from the above description, the synchronizer mechanism 10 is characterized in that the synchronizer ring 13 is maintained in the neutral position by engagement with the key elements 14 at its first internal radial projections 13b under the biasing force of spring 15 to restrict axial movement of the synchronizer ring 13 when the clutch sleeve 12 is shifted leftwards and that the annular spring 15 is compressed radially inwardly in shifting operation of the clutch sleeve 12 to permit axial movement of the synchronizer ring 13. With this arrangement, the annular spring 15 acts to more reliably retain the synchronizer ring 13 in its neutral and shifted positions regardless of any error in assembly of the components or any differences in tolerances of the assembled components, and the biasing force of spring 15 is maintained in a predetermined value for a long period of time to ensure shifting operation of the clutch sleeve under a predetermined load. Furthermore, the synchronizer mechanism 10 is characterized in that the second internal radial projections 13c of synchronizer ring 13 are arranged to be engaged with the chamfers 16b₁ of shorter external spline teeth 16b at their chamfers 13c₃ for establishing synchronization between the transmission shaft 21 and the gear 22 in shifting operation of the clutch sleeve 12. With this arrangement, the axial length of the synchronizer mechanism 10 can be reduced, and sufficient strength of the chamfers 13c₃ of internal radial projections 13a is ensured. Moreover, it is advantageous that engagement of the internal spline teeth 12a of clutch sleeve 12 with the first longer external spline teeth 16a of hub portion 16 can be effected immediately after synchronization between the transmission shaft 21 and the gear 22.

Figure 9:
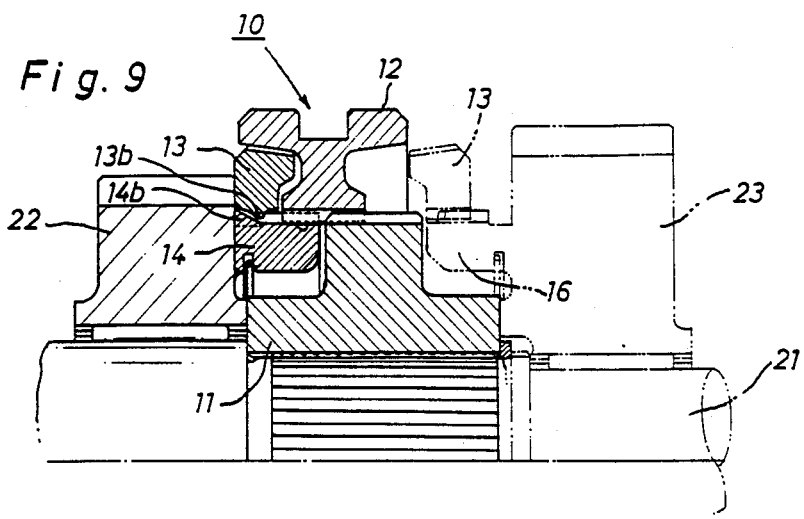
FIG. 9 is a cross-sectional view illustrating a modification of the synchronizer mechanism shown in FIGS. 1 to 6.

In FIG. 9 there is illustrated a modification of the synchronizer mechanism 10, wherein an internal diameter defined by the radial projections 13b, 13c of synchronizer ring 13 is determined to be larger than an internal diameter defined by the internal spline teeth 12a of clutch sleeve 12. In this modification, the outer edge of synchronizer ring 13 is spaced from the respective flared portions 14b of key elements 14 after engagement of the clutch sleeve 12 with the hub portion 16 of gear 22 in shifting operation. As a result, the biasing force of spring 15 acting on the synchronizer ring 13 through key elements 14 can be eliminated. This is effective to avoid unexpected disengagement of the clutch sleeve 12 from the hub portion 16 of gear 22.

Figure 10:
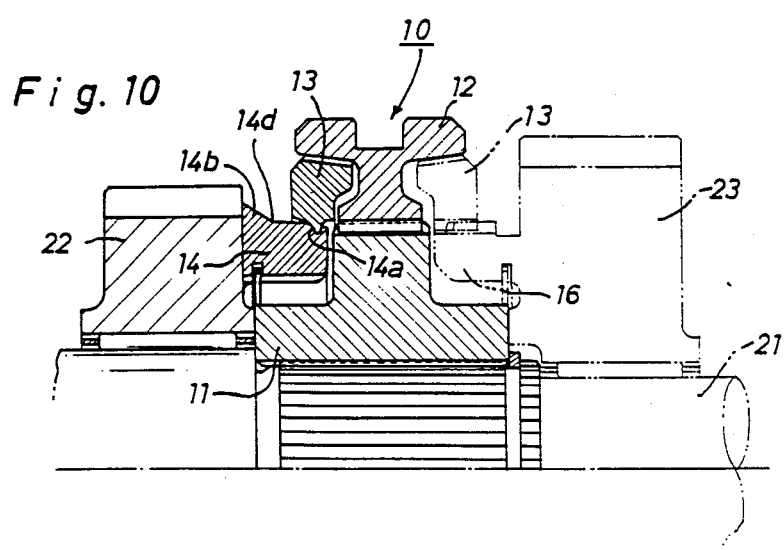
FIG. 10 is a cross-sectional view illustrating another modification of the synchronizer mechanism shown in FIGS. 1 to 6.

In FIG. 10 there is illustrated another modification of the synchronizer mechanism 10, wherein the key elements 14 each are formed with a guide surface 14d inclined at an angle, for instance 7 degrees, from the flared portion 14b toward the transverse recess 14a. In this modification, the guide surface 14d of key element 14 serves to effect smooth return movement of the synchronizer ring 13 toward the transverse recess 14a in shifting operation of the clutch sleeve 12 toward the neutral position.

Figure 11:
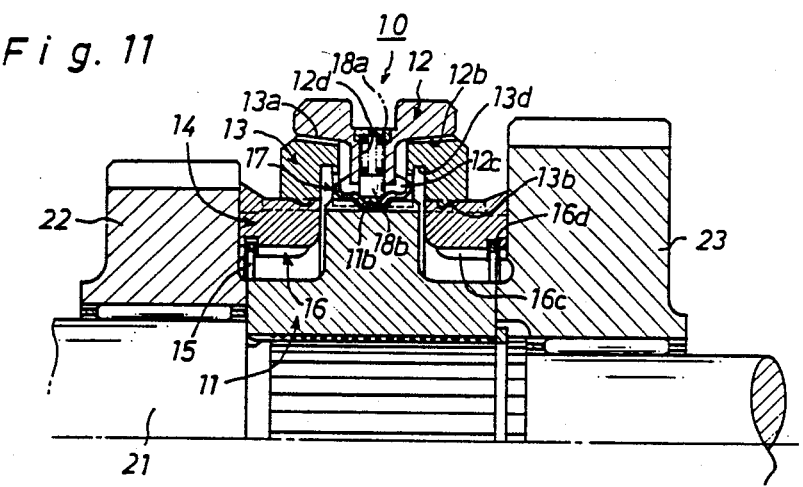
FIGS. 11 and 12 illustrate a further modification of the synchronizer mechanism shown in FIGS. 1 to 6, the illustration of FIG. 11 being taken along line XI—XI in FIG. 13, and the illustration of FIG. 12 being taken along line XII—XII in FIG. 13.
Figure 12:
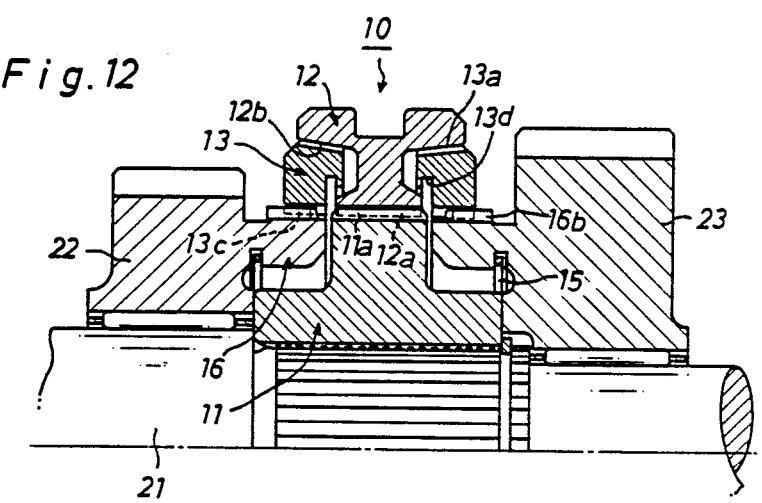
Figure 13:
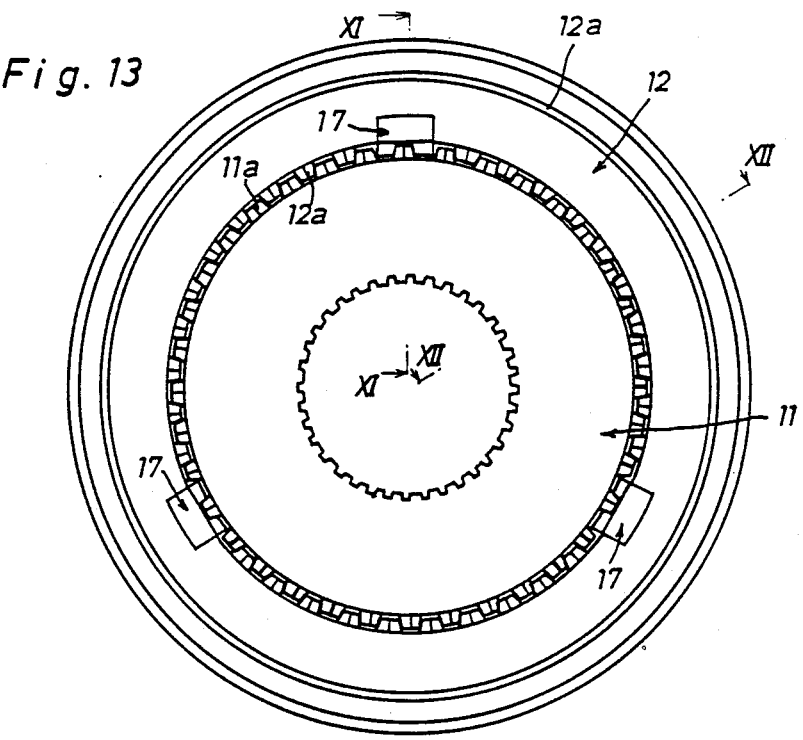
FIG. 13 is a side view illustrating the components shown in FIG. 11.
Figure 14:
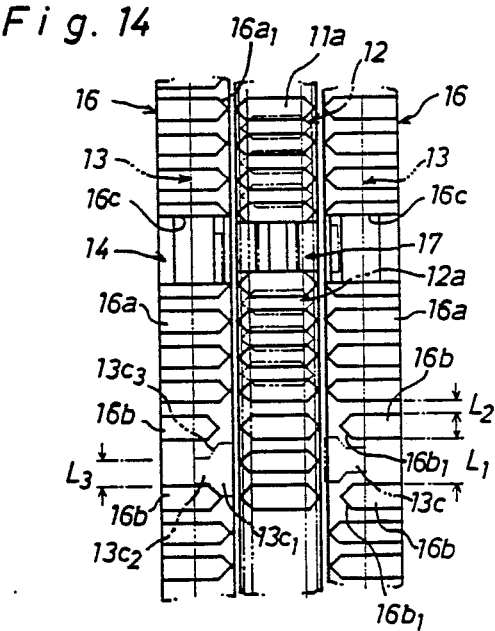
FIG. 14 illustrates the relative positions of the components shown FIGS. 11 and 12.

In FIGS. 11 to 14 there is illustrated a further modification of the synchronizer mechanism 10, wherein three circumferentially equally spaced external spline teeth 11a of the hub member 11 each are formed at its central portion with a radial recess 11b for receiving therein a leaf spring 17, the clutch sleeve 12 is formed with three circumferentially equally spaced radial recess 12c and bores 12d which correspond with the radial recesses 11b of hub member 11, and the synchronizer ring 13 is formed at its inner periphery with an annular groove 13d to be engaged with one leg of the leaf spring 17. As shown in FIGS. 11 and 13, the leaf spring 17 is engaged at its central portion with each radial recess 11b of the circumferentially equally spaced external spline teeth 11a and receives thereon a pin 18b which is slidably disposed within each radial bore 12d in clutch sleeve 12 and loaded radially inwardly by a compression coil spring 18a. A closure plug is fixedly coupled with each outer end of radial bores 12d to receive the outer end of coil spring 18a. Thus, the leaf springs 17 each are retained in place by engagement with the radial recess 11b under the biasing force of coil spring 18a to be engaged at its one leg with the annular groove 13d of synchronizer ring 13 in shifting operation of the clutch sleeve 12. Other construction and components are substantially the same as those in the synchronizer mechanism 10 shown in FIGS. 1 to 6.

Figure 15A:
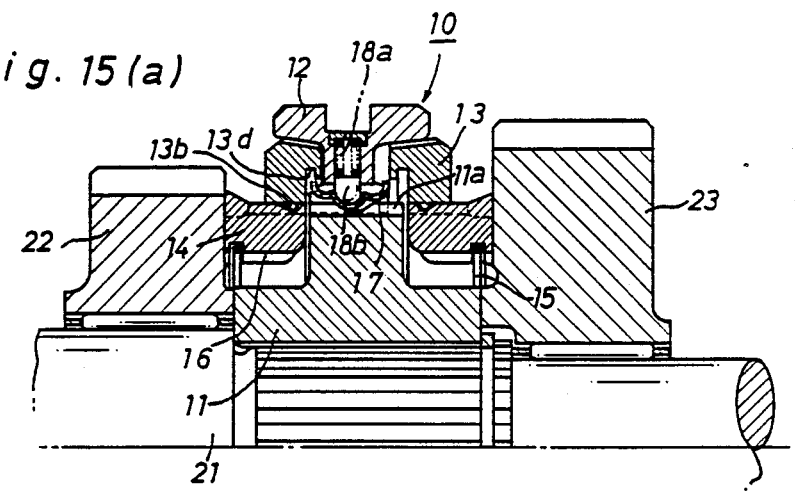
FIGS. 15(a) and 15(b) each illustrate a shifted condition of the clutch sleeve shown in FIG. 11.
Figure 15B:
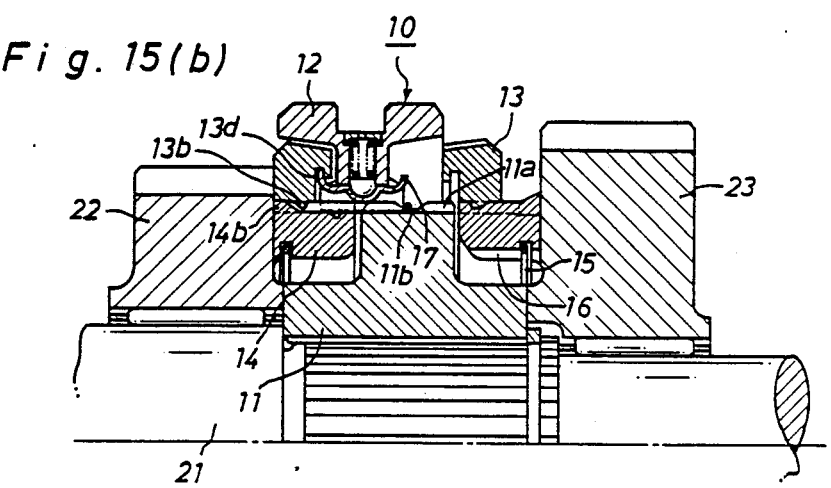

Assuming that the clutch sleeve 12 is shifted leftwards from the neutral position in the modified synchronizer mechanism, the synchronizer ring 13 is frictionally engaged at its external conical surface 13a with the left-hand internal conical surface 12b of clutch sleeve 12 to rotate with the clutch sleeve 12 and is urged toward the change-speed gear 22 against a restriction force caused by engagement with the key elements 14 under the biasing force of spring 15. This causes relative rotation between the synchronizer ring 13 and the cylindrical hub portion 16 of gear 22 and causes the second radial projections 13c of ring 13 to engage the second shorter external spline teeth 16b of hub portion 16. In this instance, as shown in FIG. 15(a), the leaf springs 17 slightly ride over the corresponding external spline teeth 11a of hub member 11 to be engaged with the annular groove 13d of synchronizer ring 13 at their left-hand legs. As a result, the axial movement of clutch sleeve 12 is resisted by the balk action or engagement between the chamfers 13c₃ of projections 13c and the chamfers 16b₁ of shorter external spline teeth 16b to establish synchronization between the clutch sleeve 12 and the gear 22. Subsequently, the first internal radial projections 13b of ring 13 ride over the key elements 14 against the biasing force of spring 15 thereby compressing them radially inwardly. This permits the second internal radial projections 13c of ring 13 to pass through axial grooves respectively formed between the shorter external spline teeth 16b of hub portion 16. Thus, as shown in FIG. 15(b), the internal spline teeth 12a of clutch sleeve 12 are smoothly brought into engagement with the first longer external spline teeth 16a of hub portion 16 to accomplish drive connection between the transmission shaft 21 and the change-speed gear 22. Simultaneously, the leaf springs 17 fully ride over the corresponding external spline teeth 11a of hub member 11 and engage the annular groove 13d of synchronizer ring 13 at their left-hand legs. After engagement of the clutch sleeve 12 with the hub portion 16 of gear 22, the outer edge of synchronizer ring 13 is maintained in engagement with the flared portions 14b of key elements 14 under the biasing force of spring 15.

When the clutch sleeve 12 is shifted from the left-hand position toward the neutral position to disconnect the change-speed gear 22 from the transmission shaft 21, the internal spline teeth 12a of clutch sleeve 12 are disengaged from the longer external spline teeth 16a of hub portion 16 to release the compression of key elements 14. As a result, the key elements 14 are radially outwardly moved and axially inwardly tilted by the biasing force of spring 15. Simultaneously, the leaf springs 17 act to pull the synchronizer ring 13 rightwards. This causes the synchronizer ring 13 to slide axially inwardly and engage the transverse recesses 14a of key elements 14 at their first internal radial projections 13b. Thus, the synchronizer ring 13 is smoothly returned to the neutral position, and the leaf springs 17 are engaged with the radial recesses 11b of external spline teeth 11a and disengaged from the annular groove 13d of synchronizer ring 13.

Figure 16A:
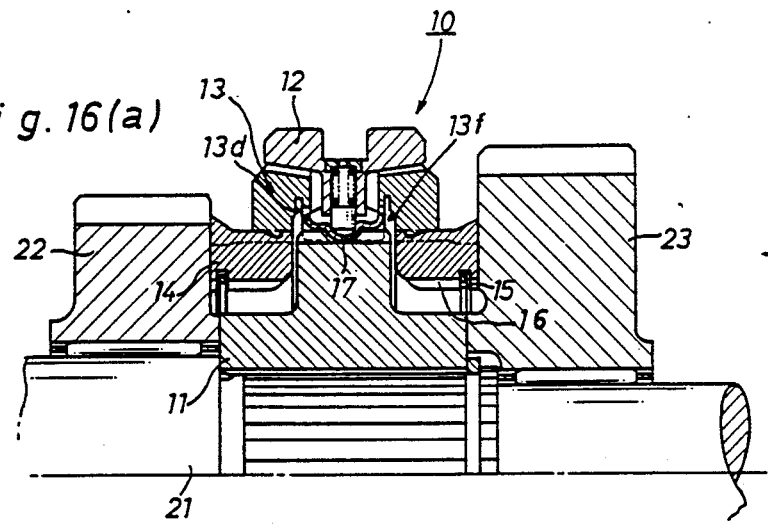
FIG. 16(a) is a cross-sectional view illustrating a modification of the synchronizer mechanism shown in FIGS. 11 to 14.
Figure 16B:
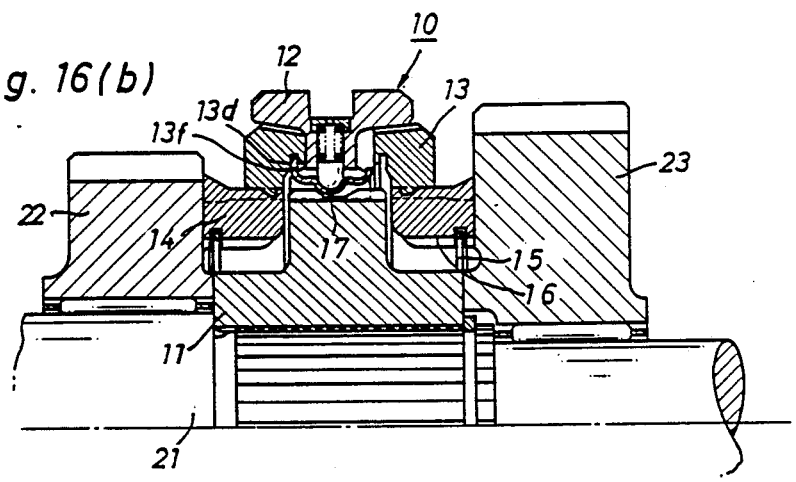
FIGS. 16(b) and 16(c) each illustrate a shifted condition of the clutch sleeve shown in FIG. 16(a)
Figure 16C:
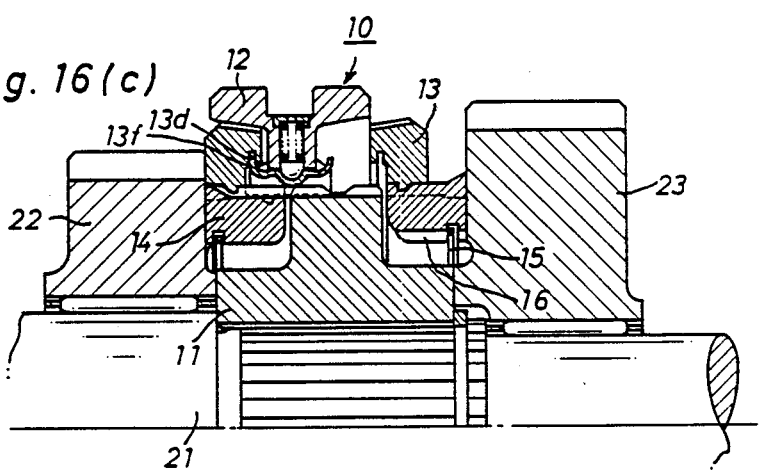
Figure 17:
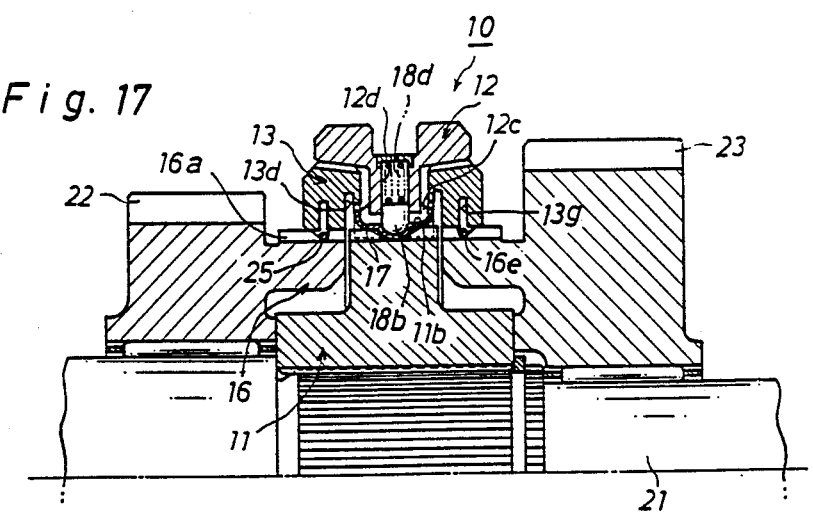
FIGS. 17 and 18 illustrate another modification of the synchronizer mechanism shown in FIGS. 11 to 14, the illustration of FIG. 17 being taken along line A—A in FIGS. 19 and 20(a), respectively, and the illustration of FIG. 18 being taken along line B—B in FIGS. 19 and 20(a), respectively.
Figure 18:
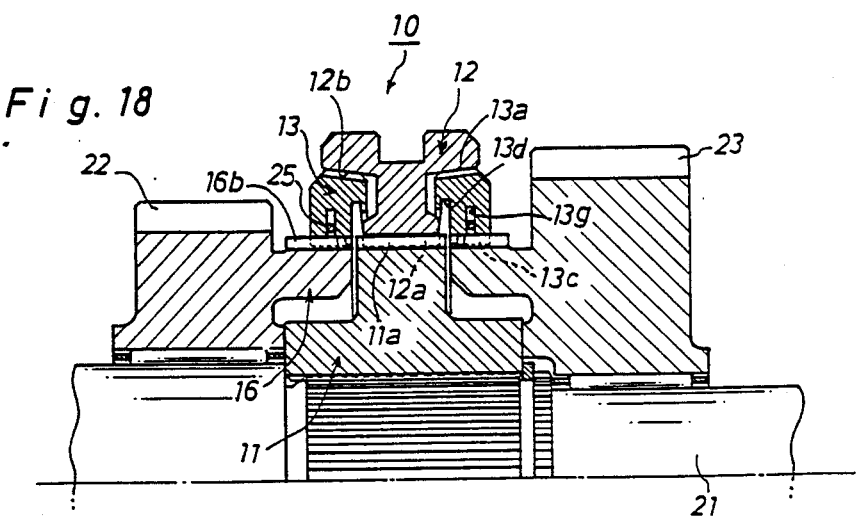
Figure 19:
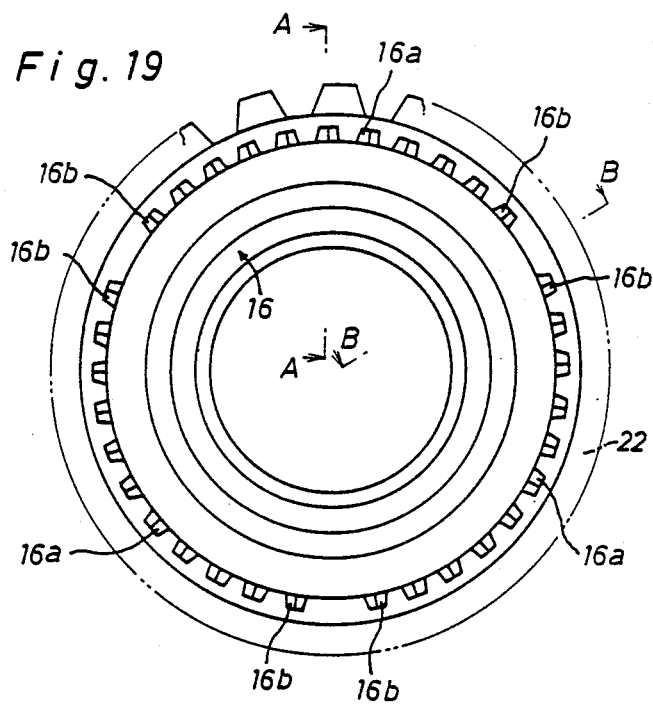
FIG. 19 is a front view of a cylindrical hub portion of the change-speed gear shown in FIG. 17.
Figure 21:
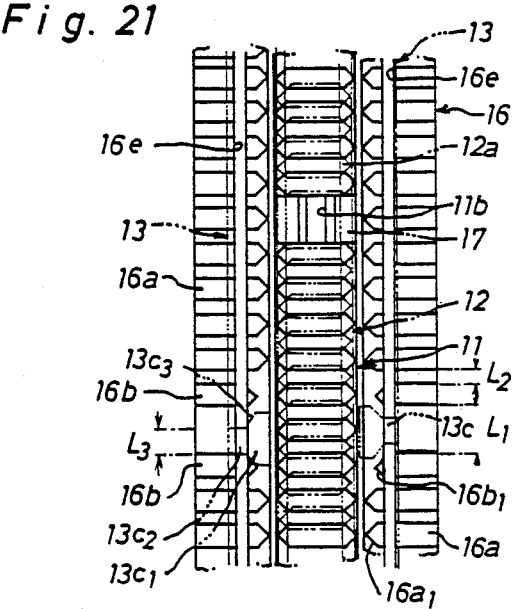
FIG. 21 illustrate the relative positions of the components shown FIGS. 17 and 18.
Figure 20A:
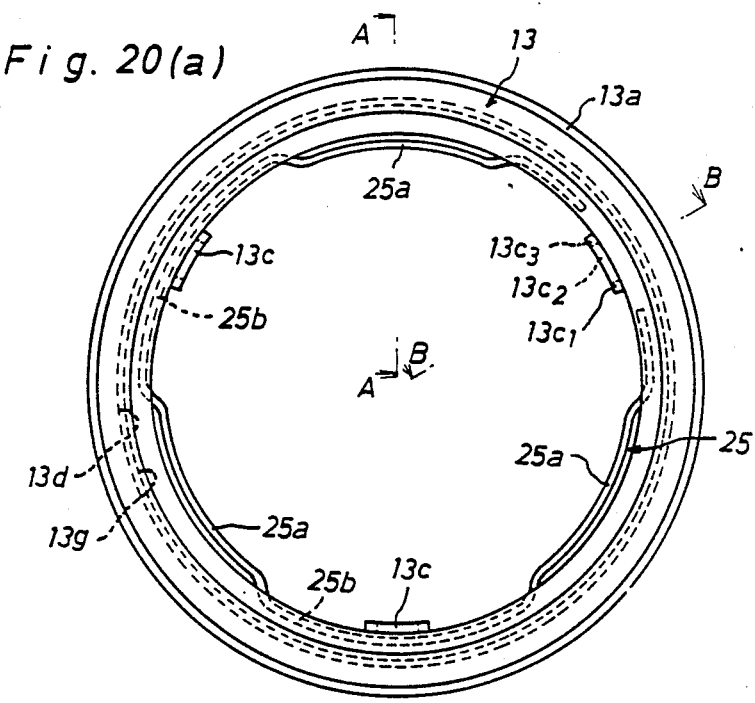
FIG. 20(a) is a front view of a synchronizer ring shown in FIGS. 17 and 18.
Figure 20B:
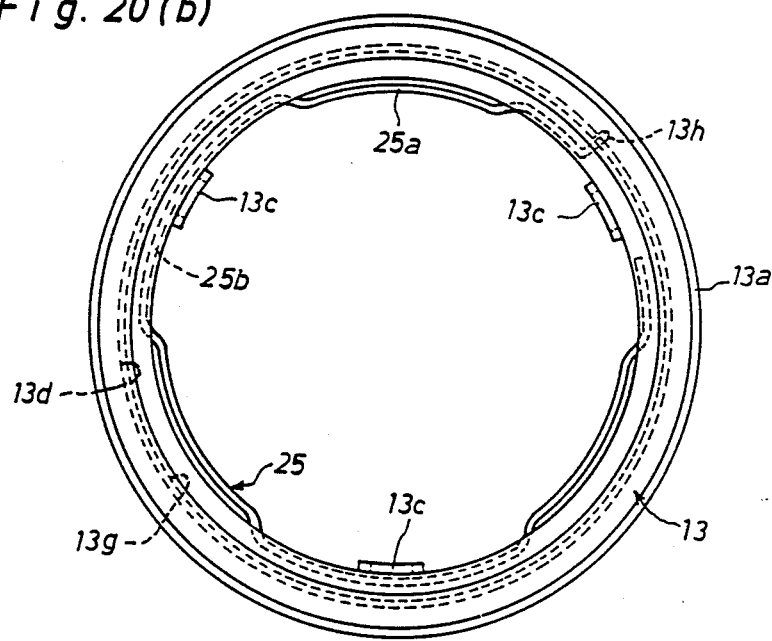
FIG. 20(b) is a front view illustrating a modification of the synchronizer ring shown in FIG. 20(a)

In FIG. 16(a) there is illustrated a modification of the synchronizer mechanism shown in FIGS. 11 to 14, wherein the annular groove 13d of synchronizer ring 13 is formed at its outside inner wall with an annular shoulder 13f which is provided to be engaged with the left-hand legs of leaf springs 17 before start of the balk action between the chamfers 13c₃ of internal radial projections 13c and the chamfers 16b₁ of shorter external spline teeth 16b. In shifting operation of the clutch sleeve 12 in this modification, as shown in FIG. 16(b), the leaf springs 17 are brought into engagement with the annular shoulder 13f in groove 13d at their left-hand legs to push the synchronizer ring 13 leftwards prior to engagement between the chamfers 13c₃ of internal radial projections 13c and the chamfers 16b₁ of shorter external spline teeth 16b. This is effective to more reliably establish synchronization between the clutch sleeve 12 and the gear 22 as shown in FIG. 16(c) even when the clutch sleeve 12 has been rapidly shifted.

In FIGS. 17 to 21 there is illustrated another modification of the synchronizer mechanism shown in FIGS. 11 to 14, wherein the key elements 14 are eliminated from the cylindrical hub portion 16 of change-speed gear 22, and wherein the annular spring 15 is replaced with a radially contractible annular spring 25. In this modification, the synchronizer ring 13 is formed at its inner periphery with a second annular groove 13g for receiving therein the annular spring 25, and the cylindrical hub portion 16 of gear 22 is formed at its outer periphery with an annular recess 16e which is arranged across the external spline teeth 16a and 16b to correspond with the annular groove 13g of ring 13. As shown in FIG. 20(a), the annular spring 25 is disposed within the annular groove 13g of ring 13 and retained in place by engagement with the annular recess 16e of hub portion 16. The angular spring 25 has three circumferentially equally spaced small diameter sections 25a which are resiliently engaged with the annular recess 16e of hub portion 16 at its three circumferentially equally spaced portions crossing the first longer external spline teeth 16a. The remaining large diameter sections 25b of spring 25 are arranged to correspond with the second internal radial projections 13c of synchronizer ring 13. When it is desired to more precisely retain the annular spring 25 in place, one end of the spring 25 may be inserted into a radial hole 13h formed in the annular groove 13g as shown in FIG. 20(b).

Figure 22A:
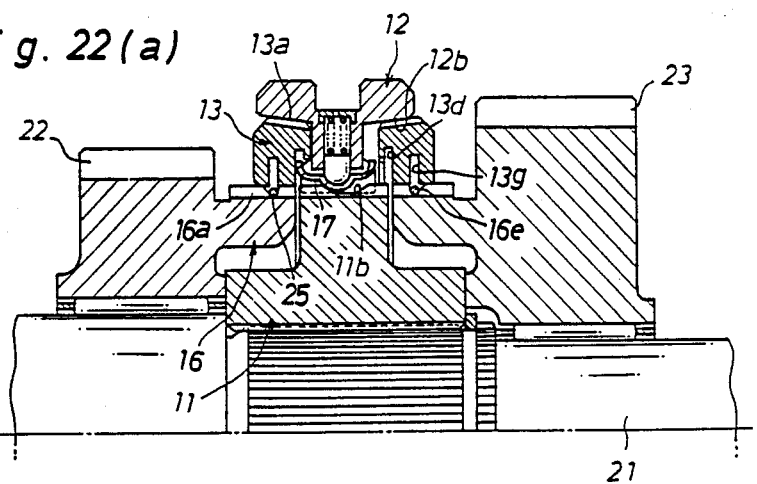
FIGS. 22(a) and 22(b) each illustrate a shifted condition of the clutch sleeve shown in FIGS. 17 and 18.
Figure 22B:
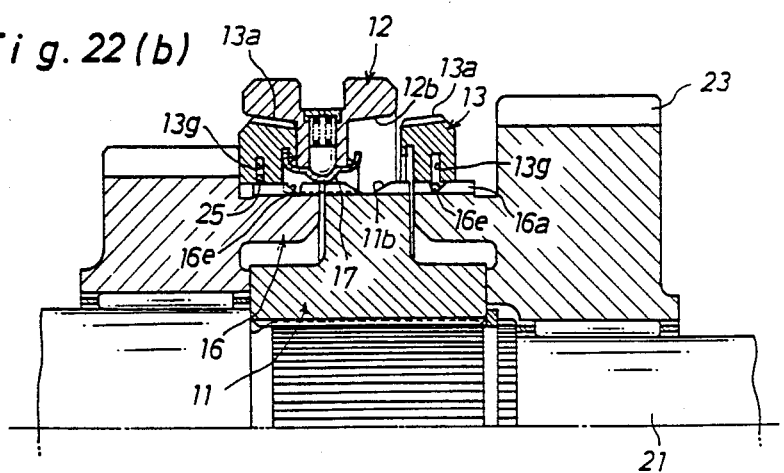

Assuming that the clutch sleeve 12 is shifted leftwards from the neutral position in the modified synchronized mechanism, the synchronizer ring 13 is frictionally engaged at its external conical surface 13a with the left-hand internal conical surface 12b of clutch sleeve 12 to rotate with the clutch sleeve 12 and is urged toward the change-speed gear 22 against a restriction force caused by the annular spring 25. This causes relative rotation between the synchronizer ring 13 and the cylindrical hub portion 16 of gear 22 and causes the second internal radial projections 13c of ring 13 to engage the second shorter external spline teeth 16b of hub portion 16. (see FIG. 21) In this instance, as shown in FIG. 22(a), the leaf springs 17 slightly ride over the corresponding external spline teeth of hub member 11 to be engaged with the annular groove 13d of synchronizer ring 13 at their left-hand legs. As a result, the axial movement of clutch sleeve 12 is resisted by the balk action or engagement between the chamfers 13c₃ of internal radial projections 13c and the chamfers 16b₁ of shorter external spline teeth 16b to establish synchronization between the clutch sleeve 12 and the gear 22. Subsequently, the three circumferentially equally spaced small diameter sections 25a of spring 25 ride over the first longer external spline teeth 16a of hub portion 16 and are expanded radially outwardly by engagement with them to urge the synchronizer ring 13 toward the clutch sleeve 12. This permits the second internal radial projections 13c of ring 13 to pass through axial grooves respectively formed between the shorter external spline teeth 16b of hub portion 16. Thus, as shown in FIG. 22(b), the internal spline teeth 12a of clutch sleeve 12 are smoothly brought into engagement with the first longer external spline teeth 16a of hub portion 16 to accomplish drive connection between the transmission shaft 21 and the change-speed gear 22. Simultaneously, the leaf springs 17 fully ride over the corresponding external spline teeth of hub member 11 and engage the annular groove 13d of synchronizer ring 13.

When the clutch sleeve 12 is shifted from the left-hand position toward the neutral position to disconnect the change-speed gear 22 from the transmission shaft 21, the internal teeth of clutch sleeve 12 are disengaged from the longer external spline teeth 16a of hub portion 16. In this instance, the leaf springs 17 act to pull the synchronizer ring 13 rightwards. This causes the small diameter sections 25a of spring 25 to slide axially inwardly and engage the annular recess 16e of hub portion 16. Thus, the synchronizer ring 13 is smoothly returned to the neutral position, and the leaf springs 17 are engaged with the radial recesses 11b of external spline teeth 11a and disengaged from the annular groove 13d of synchronizer ring 13.

Figure 23:
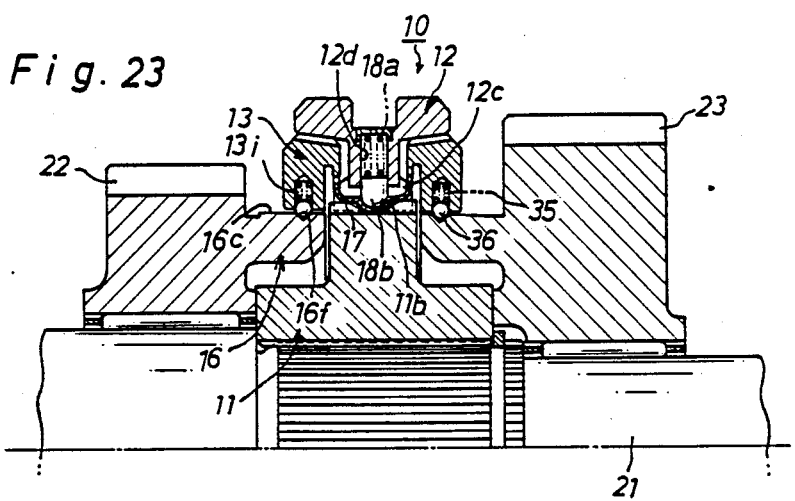
Figure 24:
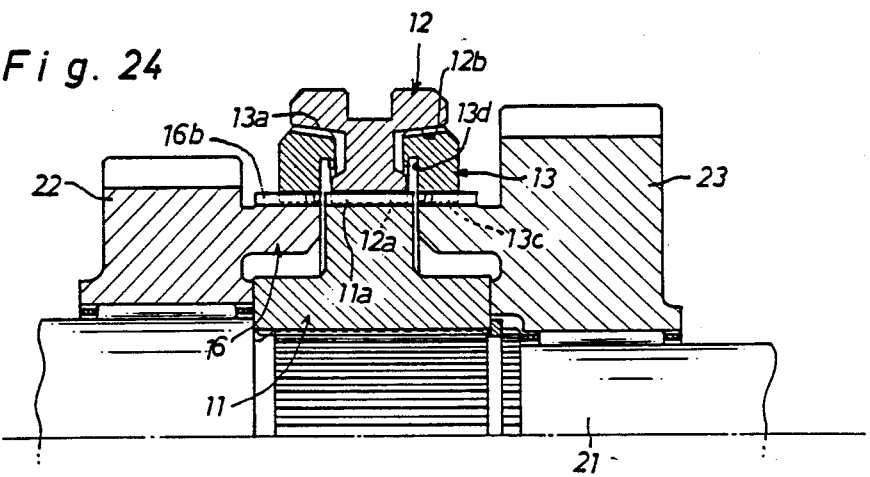

In FIGS. 23 to 27 there is illustrated a further modification of the synchronizer mechanism shown in FIGS. 11 to 14, wherein the key elements 14 are eliminated from the cylindrical hub portion 16 of change-speed gear 22, and wherein the annular spring 15 is replaced with coil springs 35 which are disposed in three circumferentially equally spaced radial holes 13i formed in the inner peripheral portion of synchronizer ring 13 as shown in FIG. 26. In this modification, as shown in FIGS. 23 and 25, the cylindrical hub portion 16 of gear 22 is formed at its outer periphery with three circumferentially equally spaced transverse recesses 16f which are each arranged in a space 16C between two sets of the first longer external spline teeth 16a. The transverse recesses 16f of hub portion 16 each receive therein a ball 36 which is radially movably disposed in the respective radial holes 13i and is radially inwardly loaded by the corresponding coil spring 35. Other construction and components are substantially the same as those in the synchronizer mechanism shown in FIGS. 11 to 14.

Figure 28A:
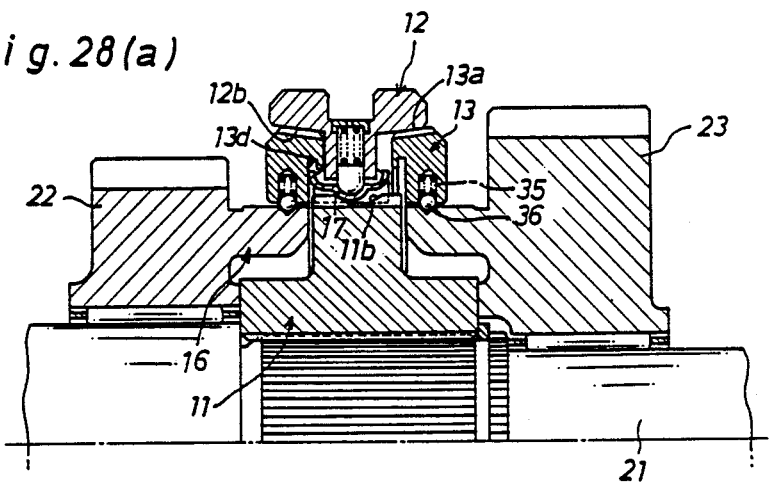
FIGS. 28(a) and 28(b) each illustrate a shifted condition of the clutch sleeve shown in FIGS. 23 and 24.
Figure 28B:
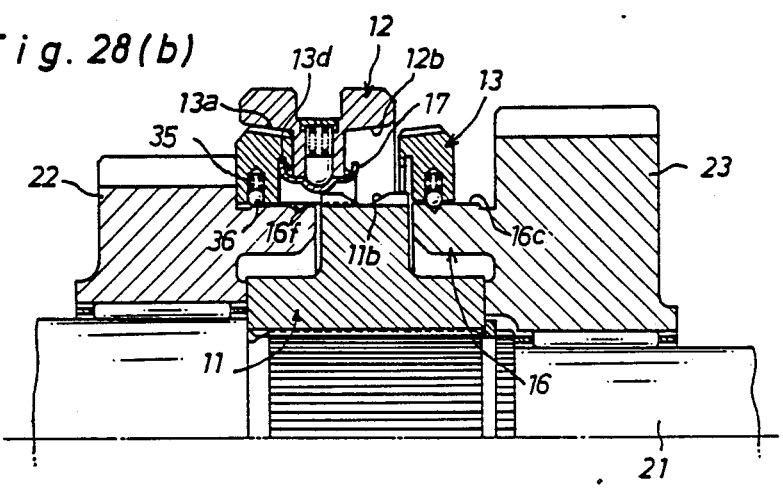

Assuming that in the modified synchronizer mechanism, the second internal radial projections 13c of ring 13 are brought into engagement with the shorter external spline teeth 16b of hub portion 16 in shifting operation of the clutch sleeve 12, as shown in FIG. 27(a), the leaf springs 17 slightly ride over the corresponding external spline teeth of hub member 11 to be engaged with the annular groove 13d of synchronizer ring 13 at their left-hand legs, as shown in FIG. 28(a). As a result, the axial movement of clutch sleeve 12 is resisted by the balk action or engagement between the chamfers 13c₃ of internal radial projections 13c and the chamfers 16b₁ of shorter external spline teeth 16b to establish synchronization between the clutch sleeve 12 and the gear 22. Subsequently, the balls 36 ride over the outer periphery of hub portion 16 against the coil springs 35 to urge the synchronizer ring 13 toward the clutch sleeve 12. This permits the second internal radial projections 13c of ring 13 to pass through axial grooves respectively formed between the shorter external spline teeth 16b of hub portion. Thus, the internal spline teeth of clutch sleeve 12 are smoothly brought into engagement with the first longer external spline teeth 16a of hub portion 16 to accomplish drive connection between the transmission shaft 21 and the change-speed gear 22. Simultaneously, the leaf springs 17 fully ride over the corresponding external spline teeth of hub member 11 and engage the annular groove 13d of synchronizer ring 13, as shown in FIG. 28(b).

Figure 29:
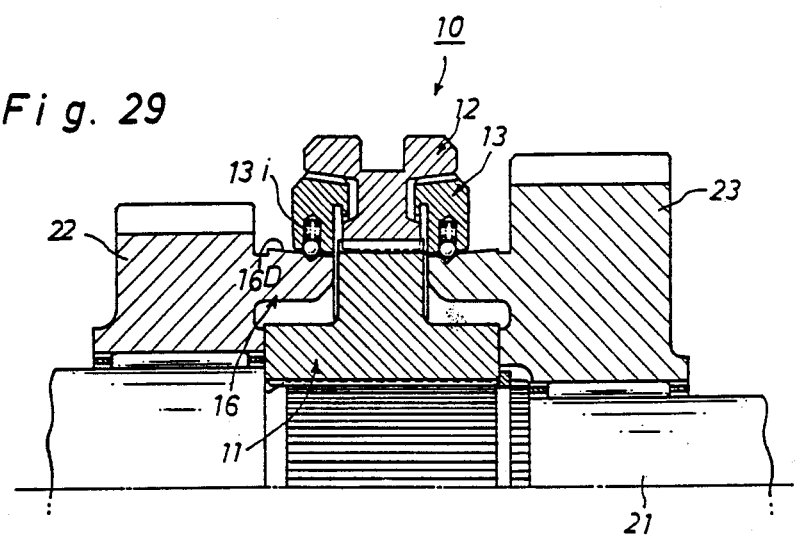
FIG. 29 is a cross-sectional view illustrating a modification of the synchronizer mechanism shown in FIGS. 23 and 24.
Figure 30:
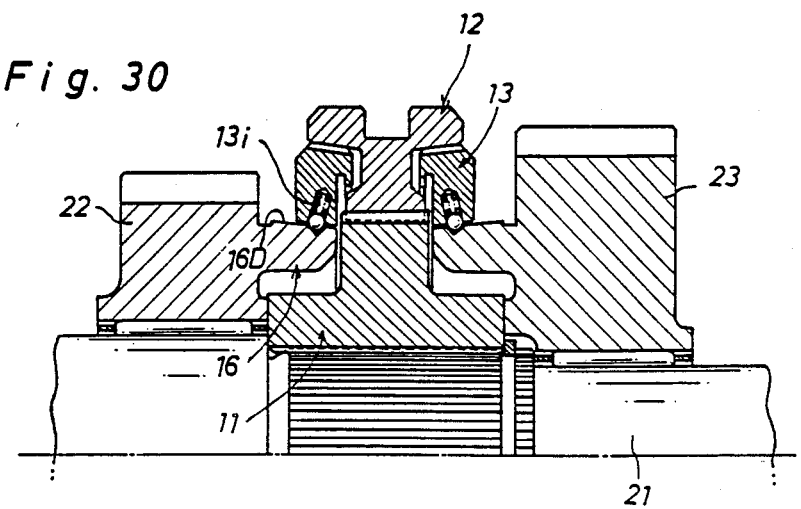
FIG. 30 is a cross-sectional view illustrating another modification of the synchronizer mechanism shown in FIGS. 23 and 24.

In a modification of the synchronizer mechanism shown in FIGS. 23 to 27, the leaf spring 17 and their associated parts may be eliminated as shown in FIG. 29. In this modification, it is desirable that each outer periphery of hub portion 16 between the two sets of longer external spline teeth 16a is formed as a radial guide surface 16D which is inclined at a slight angle toward the transverse recess 16f to effect smooth return movement of the synchronizer ring 13 in shifting operation of the clutch sleeve toward the neutral position. In addition, as shown in FIG. 30, the radial holes 13i in synchronizer ring 13 each may be inclined at an appropriate angle axially outwardly to facilitate drilling thereof.

Having now fully set forth both structure and operation of various preferred embodiments of the concept underlying the present invention, other embodiments as well as certain variations and modifications the embodiments herein shown and described will obviously occur to those skilled in the art upon becoming familiar with the underlying concept. It is to be understood, therefore, that with the scope of the appended claims, the invention may be practiced otherwise than as specifically set forth herein.

What is claimed is:

1. A gear synchronizer mechanism comprising a gear member rotatable on a transmission shaft and having a cylindrical hub portion formed with external spline teeth, a hub member formed with external spline teeth and being mounted on said shaft for rotation therewith, a clutch sleeve formed at one side thereof with a internal conical surface and at an inner periphery thereof with internal spline teeth in continual engagement with the external spline teeth of said hub member and being axially shiftable on said hub member to be engaged at the internal spline teeth thereof with the external spline teeth of said cylindrical hub portion, and a synchronizer ring formed with an external conical surface for frictional engagement with the internal conical surface of said clutch sleeve and being axially movable on said cylindrical hub portion to establish synchronization between said shaft and said gear member when engaged with said clutch sleeve, said synchronizer ring being formed at an inner periphery thereof with a plurality of circumferentially spaced internal radial projections, said cylindrical hub portion of said gear member being formed at an inner periphery thereof with an annular groove and having a plurality of circumferentially equally spaced radial grooves defined therein, each of which receives therein a corresponding radially movable key element, said key elements being supported by a radially contractible annular spring disposed within the annular groove of said cylindrical hub portion and resiliently engaged with said synchronizer ring under the biasing force of said spring in such a manner as to restrict axial movement of said synchronizer ring in shifting operation of said clutch sleeve, each of said key elements being formed with a transverse recess which receives a said internal radial projection of said synchronizer ring to restrict axial movement of said synchronizer ring under the biasing force of said spring.

2. A gear synchronizer mechanism as claimed in claim 1 wherein said key elements each are formed thereon with a radially outwardly flared end for engagement with an outer end of said synchronizer ring.

3. A gear synchronizer mechanism as claimed in claim 2, wherein an internal diameter defined by said internal radial projections of said synchronizer ring is larger than an internal diameter defined by the internal spline teeth of said clutch sleeve.

4. A gear synchronizer mechanism as claimed in claim 2, wherein said key elements each are formed thereon with a guide surface inclined at a predetermined angle from said flared end toward said transverse recess.

5. A gear synchronizer mechanism as claimed in claim 1, wherein a plurality of circumferentially spaced external teeth of said hub member each are formed with a radial recess for receiving therein a spring loaded member assembled with said clutch sleeve, and wherein said synchronizer ring is formed at an inner periphery thereof with an annular groove to be engaged with one end of said spring loaded member in shifting operation of said clutch sleeve.

6. A gear synchronizer mechanism as claimed in claim 5, wherein the annular groove of said synchronizer ring is formed at its outside wall with an annular shoulder to be engaged with the one end of said spring loaded member.

* * * * *